(12) United States Patent
Heinemann et al.

(10) Patent No.: US 8,939,687 B2
(45) Date of Patent: Jan. 27, 2015

(54) HOB PEELING DEVICE AND METHOD

(75) Inventors: Wolfgang Heinemann, Remscheid (DE); Mario Schulz, Wuppertal (DE)

(73) Assignee: Profilator GmbH & Co. KG (DE)

(*) Notice: Subject to any disclaimer, the term of this patent is extended or adjusted under 35 U.S.C. 154(b) by 261 days.

(21) Appl. No.: 13/100,072

(22) Filed: May 3, 2011

(65) Prior Publication Data

US 2011/0268523 A1 Nov. 3, 2011

Related U.S. Application Data

(63) Continuation of application No. PCT/EP2009/064411, filed on Nov. 2, 2009.

(30) Foreign Application Priority Data

Nov. 3, 2008 (DE) .......................... 10 2008 037 514

(51) Int. Cl.
*B23F 19/06* (2006.01)
*B23F 5/16* (2006.01)

(52) U.S. Cl.
CPC ........................................ *B23F 5/163* (2013.01)
USPC ................... 409/34; 409/28; 409/36; 409/37

(58) Field of Classification Search
USPC ........... 409/10–12, 25, 31, 33–36, 38, 50–51, 409/56–57
IPC ................................................ B23F 9/14,19/06
See application file for complete search history.

(56) References Cited

U.S. PATENT DOCUMENTS 906,189 A * 12/1908 Boisard ........................... 409/13
1,905,278 A * 4/1933 Edgar ............................. 409/12

(Continued)

FOREIGN PATENT DOCUMENTS

| DE | 3915976 A1 | 11/1990 |
| DE | 4122460 C1 | 4/1992 |
| DE | 102005049528 A1 | 5/2007 |
| DE | 102005049530 B4 | 6/2007 |

OTHER PUBLICATIONS

Machine translation of DE 4122460 printed from the EPO website on Jan. 11, 2013.*

(Continued)

*Primary Examiner* — Daniel Howell
(74) *Attorney, Agent, or Firm* — St. Onge Steward Johnston & Reens LLC

(57) ABSTRACT

A device for cutting teeth in gear blanks by hob peeling, the device having a workpiece spindle for holding the gear blank, the workpiece spindle being rotationally drivable about a workpiece rotational axis, the device having a tool spindle which carries a peeling wheel having cutting edges and which is rotationally drivable about a tool rotational axis, wherein the tool spindle and the workpiece spindle may be positioned relative to one another at a fixed or variable axis intersection angle, and for the purpose of forward feed and infeed, the tool spindle is movable relative to the workpiece spindle in the radial direction and in the axial direction with reference to the workpiece rotational axis by means of positioning drives, and the device having an electronic control device for controlling the positioning drives and rotationally driving the tool spindle and the workpiece spindle at a specified rotational speed ratio, optionally with a changing phase position. In order to expand the production spectrum, it is proposed that the control device is set up or may be set up in such a way that during cutting of teeth in a coarsely precut or uncut blank, a radial emerging motion out of the gear blank is superimposed on the axial feed at the end of the feed, and/or a radial submerging motion into the gear blank is superimposed on the axial feed at the start of the feed.

13 Claims, 5 Drawing Sheets

(56) References Cited

U.S. PATENT DOCUMENTS 2,034,765 A * 3/1936 Miller .............................. 409/34
2,267,182 A * 12/1941 Wildhaber ...................... 407/29
3,264,940 A * 8/1966 Wildhaber ...................... 409/36
3,570,367 A * 3/1971 Looman et al. ................. 409/34
4,066,001 A * 1/1978 Nishijima et al. .............. 409/37

OTHER PUBLICATIONS

International Search Report and Written Opinion of the International Searching Authority; PCT/EP2009/064411; Feb. 18, 2010; 9 pages.

* cited by examiner

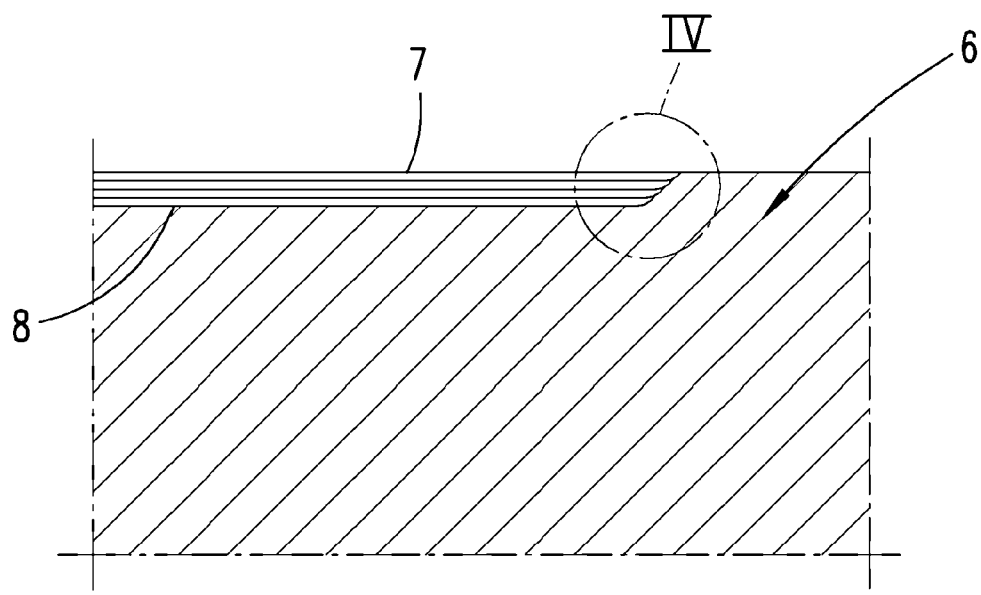
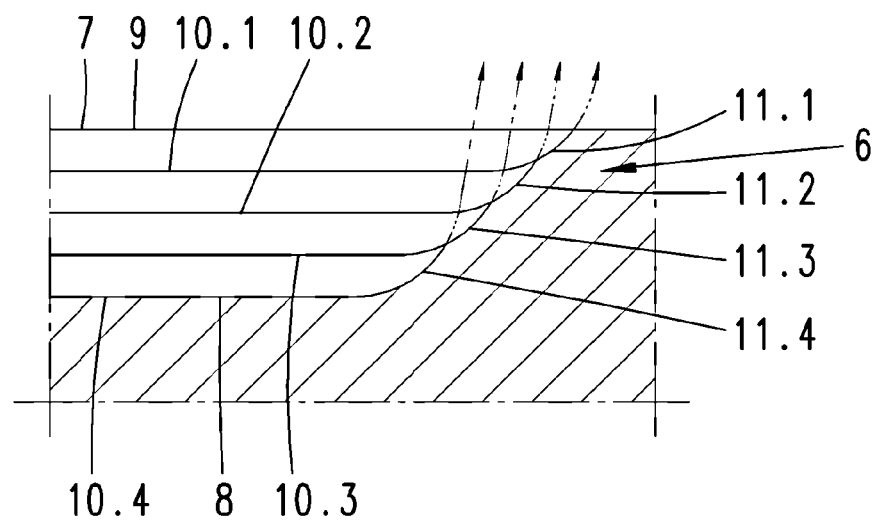

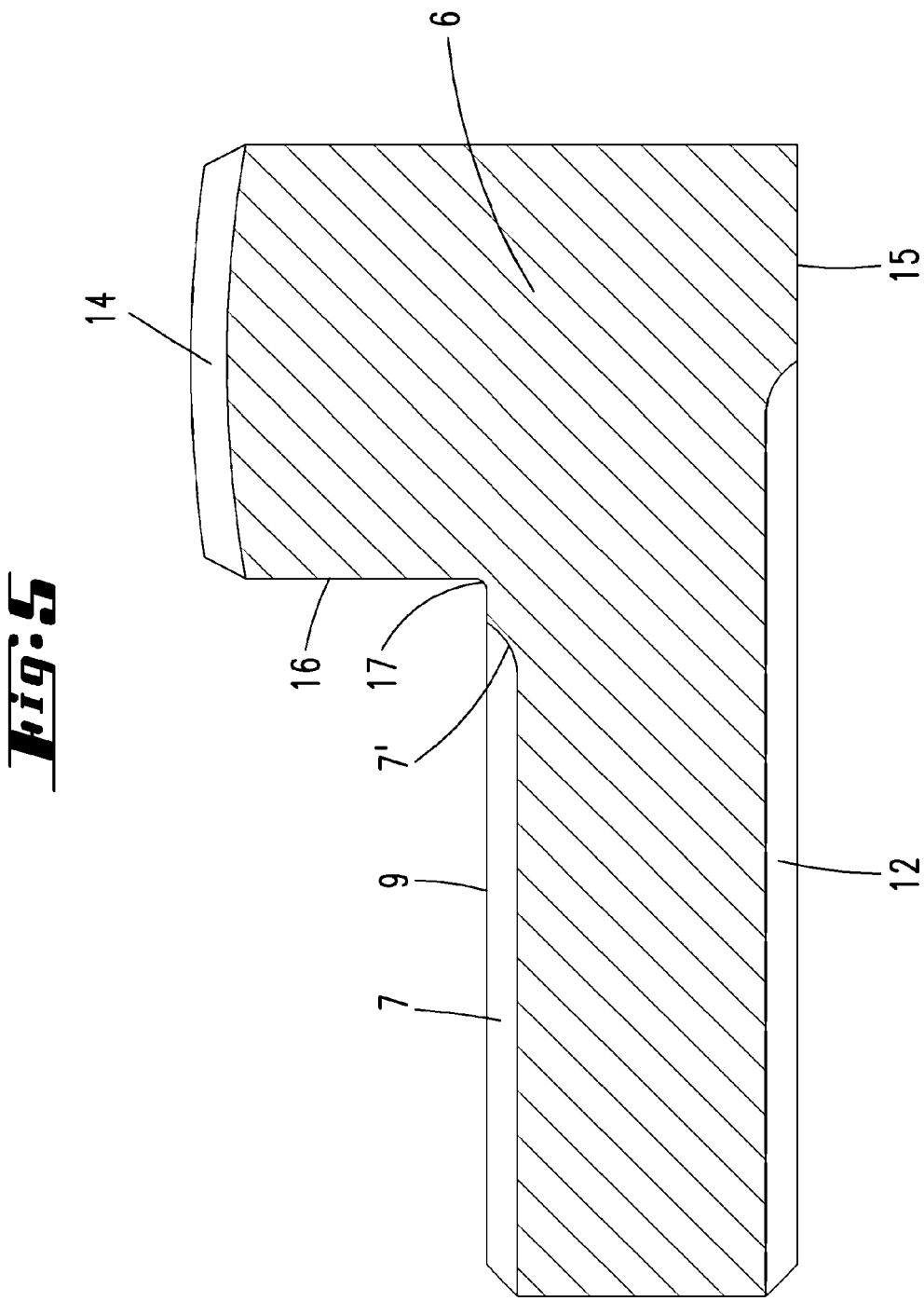

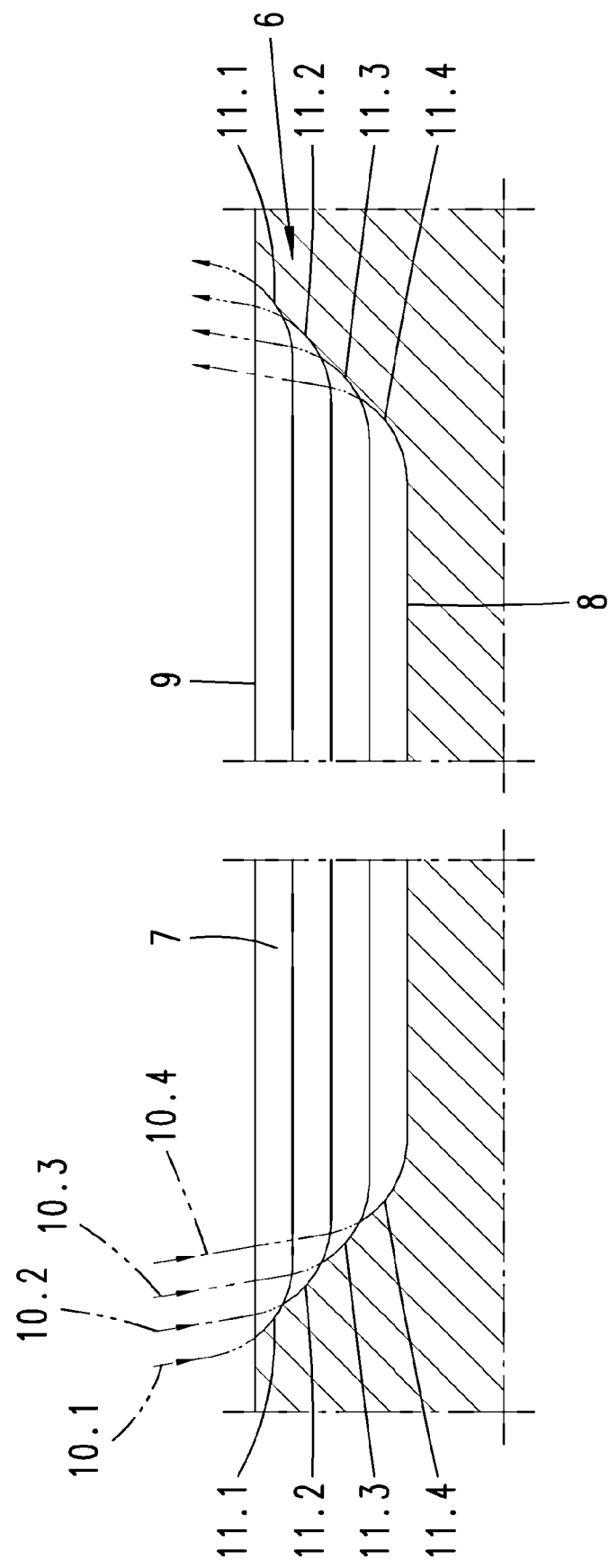

US 8,939,687 B2

HOB PEELING DEVICE AND METHOD

CROSS-REFERENCE TO RELATED APPLICATIONS

The present application is a continuation of pending International patent application PCT/EP2009/064411 filed on Nov. 2, 2009 which designates the United States and claims priority from German patent application 10 2008 037 514.4 filed on Nov. 3, 2008, the content of which is incorporated herein by reference.

FIELD OF THE INVENTION

The invention relates to a device for cutting teeth in gear blanks by hob peeling, the device having a workpiece spindle for holding the gear blank, the workpiece spindle being rotationally drivable about a workpiece rotational axis, the device having a tool spindle which carries a peeling wheel having cutting edges and which is rotationally drivable about a tool rotational axis, wherein the tool spindle and the workpiece spindle may be positioned relative to one another at a fixed or variable axis intersection angle, and for the purpose of forward feed and infeed, the tool spindle is movable relative to the workpiece spindle in the radial direction and in the axial direction with reference to the workpiece rotational axis by means of positioning drives, and the device having an electronic control device for controlling the positioning drives and rotationally driving the tool spindle and the workpiece spindle at a specified rotational speed ratio, optionally with a changing phase position.

BACKGROUND OF THE INVENTION

A device of the aforementioned type is described in DE 10 2005 049 530 B4. The device described therein has spindle drives and positioning drives which are driven by an electronic control device. In the cited document, not only the positioning drives but also the spindle drives are formed by so-called torque motors. Such motors are very "stiff" and insensitive to torque shocks.

The invention further relates to use of the above-described device, and to a method for cutting teeth in gear blanks by hob peeling, using a peeling wheel which has cutting edges, using a workpiece spindle for holding the gear blank, the workpiece spindle being rotationally driven about a workpiece rotational axis, and using a tool spindle which carries the peeling wheel and which is rotationally drivable about a tool rotational axis, wherein the tool spindle and the workpiece spindle may be positioned relative to one another at a fixed or variable axis intersection angle, forward feed and infeed taking place, the tool spindle in the radial direction relative to the workpiece spindle and in the axial direction with reference to the workpiece rotational axis, and drives of the tool spindle and the workpiece spindle are rotationally driven at a specified rotational speed ratio, optionally with a changing phase position.

DE 41 22 460 C1 describes a method for producing undercuts, which increase in depth inwardly, on straight internal gearings, in particular sliding sleeves. The internal gearing is produced by hob peeling, using a peeling wheel which undergoes simultaneous axial and radial feeding until the required undercut depth is reached. As a result of the additional feed in the circumferential direction, this method is used to incorporate angled depressions into precut gear blanks.

DE 10 2005 049 528 A1 describes a method for producing internally geared workpieces, the teeth being brought to a finished contour by hob peeling. The blank undergoes prior machining by broaching or by using a rolling process.

It is known to use hob peeling as a soft machining process for producing internal gearing and external gearing. Hob peeling is a continuous tooth cutting process. In terms of kinematics, it is between gear hobbing and gear shaping. The gearing kinematics of gear shaping resemble those of a spur pinion, whereas the kinematics of hob peeling gearing resemble those of a helical gear. A multiplicity of different gear teeth arrangements may be produced by hob peeling. Using a skewed arrangement of the workpiece axis and the tool axis, external as well as internal teeth may be produced on a machine. Hob peeling may also be used to produce straight-geared workpieces as well as helical-geared workpieces.

SUMMARY OF THE INVENTION

It is an object of the invention to expand the production spectrum of the device of the generic kind and of the method of the generic kind.

The object is achieved by the device specified in claim 1, the use specified in claim 2, and the method specified in claim 3, the subsidiary claims representing preferred refinements of the device, the use, or the method. However, the optionally subordinated claims likewise represent independent achievements of the object.

According to the invention, the generic method or the device for machining cut or uncut gear blanks which is suitable for carrying out the method is refined in such a way that a radial emerging motion out of, or a radial submerging motion into, the gear blank is superimposed on the axial feed. The emerging occurs in a zone that is associated with the end of the feed, i.e., the end of the tooth cutting. The submerging occurs in a zone that is associated with the start of the feed, i.e., the start of the tooth cutting. The feed may be oriented substantially strictly axially between submerging and emerging of the tool from the gear blank. As a result of the superimposed radial motion in the form of an emerging or submerging motion, teeth may be produced whose tooth grooves at the respective end terminate radially and axially in the surface of the uncut gear blank. Initially a straight gearing or a helical gearing is produced. The end of the teeth, i.e., the contour profile of the tooth grooves, is defined by the radial component of the emerging motion. With this type of method, it is possible to produce internal or external gearings which end just in front of a collision flank, i.e., a step, for example. Unlike the case for conventional gear shaping, an end-side undercut, or, for gear shaping, an end-side undercut in front of the collision flank, may be dispensed with. Each tooth groove then has a terminal face, so that the tooth groove is closed at least one end. In a refinement of the invention, it is provided that the apex lines of the ribs or hob teeth of the peeling wheel are situated in an enveloping surface formed by a conical lateral surface. In this configuration of the peeling wheel, the device used for carrying out the method requires only one swivel axis for setting the axis intersection angle between the workpiece spindle and the tool spindle. With reference to a coordinate system in which the workpiece spindle axis lies in the Z axis and the X axis passes through the cutting edge engagement zone, the tool axis then lies in a plane that is parallel to the Y-Z plane. The swivel axis for setting the axis intersection angle α is then situated in the X direction, so that the workpiece spindle in the Y-Z plane is inclined with respect to the Z axis. In a refinement of the invention, it is provided that teeth are cut into an uncut blank in a plurality of successive cuts. With each cut, the cutting edge achieves a greater depth of penetration. The particular cutting depth may remain constant, thereby deepening the groove between the tooth flanks in a stepwise manner. In a preferred embodiment of the invention, which is independent in character, it is provided that the successive cuts each have a decreased cutting length. The first cut, which is made in the preferably uncut blank, has the greatest cutting length. The subsequent cut is shorter. During the second cut, the peeling wheel emerges in the axial direction upstream of the end of the partial groove produced by the first cut. The radial emerging motion thus occurs at the end of the feed of each subsequent cut in the axial direction, before the radial emerging motion of a respective preceding cut. In this way of carrying out the method, the radial emerging motion is superimposed on the axial motion in such a way that the base of the milled groove at the start or at the end terminates in the form of a plurality of partial roundings following one another in succession in the axial direction. Using the above-described method, it is possible to produce tooth grooves of an internal or external gearing which end blindly, i.e., in a closed manner, at least one end. It is even possible to produce gearings which end blindly, i.e., in a closed manner, at both ends. The previously described method also allows the production of crowned gearings, in particular the production of tooth grooves whose groove base lies on a line of a circular arc with reference to the cross-sectional plane. In this way of carrying out the method, the radial emerging motion is performed as a motion that is superimposed on the axial motion at the start of the feed, and the submerging motion is performed as a superimposition on the axial motion at the end of the feed. A feed in the circumferential direction may be superimposed on the radial feed in order to produce helically toothed gear wheels. The feed is provided by a phase variation of the rotary drives for the workpiece spindle and the tool spindle.

BRIEF DESCRIPTION OF THE DRAWINGS

Exemplary embodiments of the invention are explained below with reference to accompanying drawings, which show the following:

FIG. 3 shows an enlarged view of the cross-sectional surface in the cross-section according to FIG. 2, FIG. 4 shows an enlarged view of detail IV in FIG. 3, FIG. 5 shows an illustration, corresponding to FIG. 3, of a more complex workpiece provided with three sets of gear teeth, and FIG. 6 shows an illustration, corresponding to FIG. 4, of an external gearing having a blind end at each end.

DETAILED DESCRIPTION OF THE INVENTION

Figure 1:
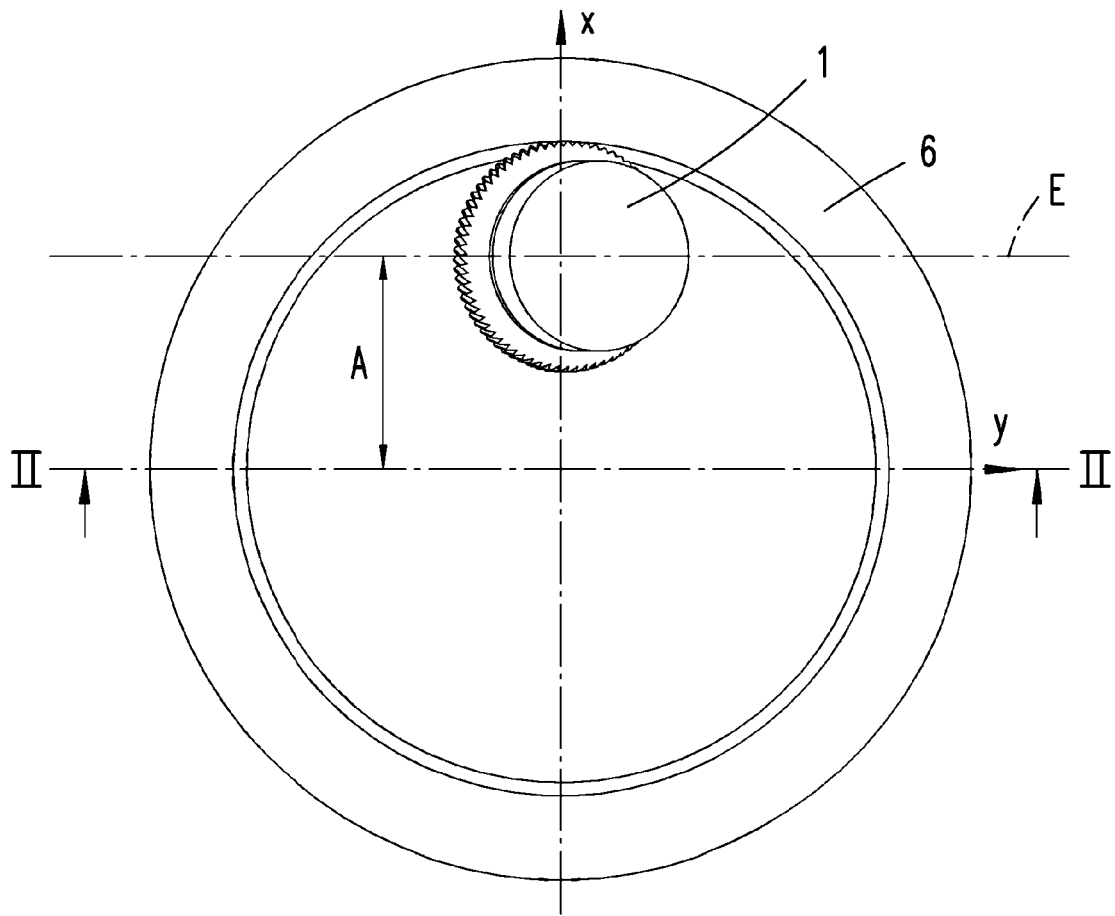
FIG. 1 schematically shows the arrangement of the tool 1 and the gear blank 6 in the direction of the X-Y plane.
Figure 2:
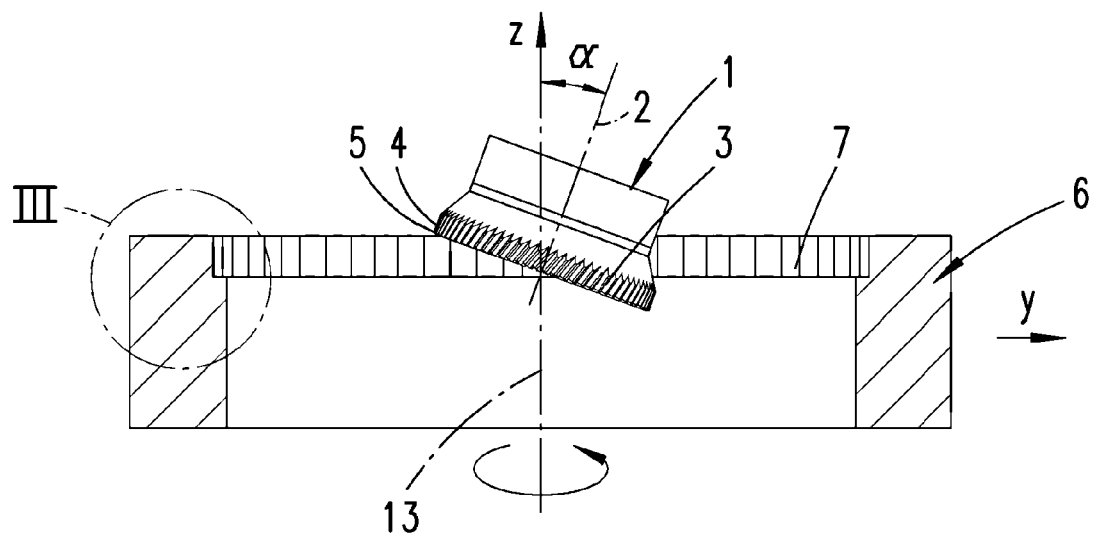
FIG. 2 shows the cross-section according to line II-II in FIG. 1, through the Y-Z plane.
Figure 7:
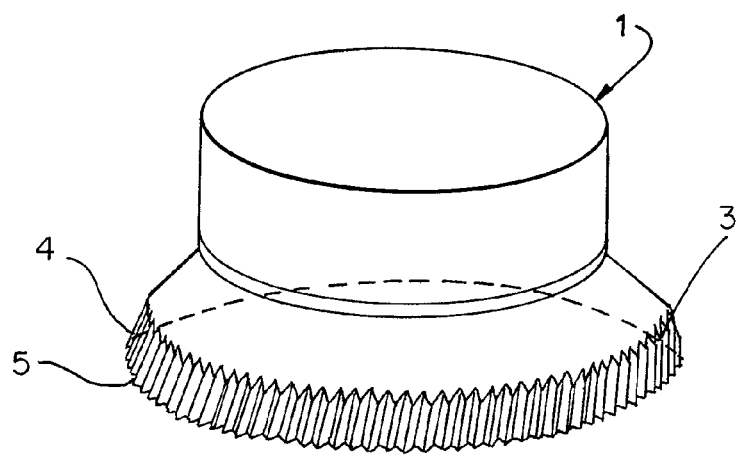
FIG. 7 shows a prospective view of the peeling wheel 1.

The device according to the invention has a design as illustrated in the drawings of DE 10 2005 049 530 B4. The device has a machine bed which carries a workpiece spindle. The workpiece spindle may be fixedly mounted on the machine bed. The tool spindle is then movable relative to the machine bed. However, it is preferred that the tool spindle is fixedly mounted on the machine bed, and the workpiece spindle is displaced for the purpose of infeed and forward feed. The workpiece spindle has a torque motor which is driven by an electrical control device. The gear blank is located on the spindle axis, i.e., on the rotor of the torque motor. However, the drive of the workpiece spindle may also be provided by a synchronous motor, a reduction gear, and/or a belt drive.

A tool spindle may be moved linearly in three spatial directions in relation to the machine bed as the result of being mounted on slides. The tool spindle is moved by means of positioning drives. The positioning drives may likewise be formed by torque motors. The positioning drives, the same as the two spindle drives, are driven by the control device. The tool spindle is also pivotable about at least one axis in order to bring the tool spindle axis into an axis intersection angle relative to the workpiece spindle axis. The tool spindle, which likewise is preferably formed by a torque motor, carries the peeling wheel 1. The peeling wheel 1 is seated directly on the rotor of the torque motor. Alternatively, the tool may be driven by a synchronous motor. The peeling wheel may also be driven by a reduction gear. The peeling wheel 1 is preferably located directly on the tool spindle.

The positioning drives may be actuated by the electronic control device in a program-controlled manner. This is carried out initially for infeed of the tool spindle in relation to the workpiece, and the workpiece spindle and tool spindle are subsequently brought into mutually synchronous operation for the purpose of forward feed. For the tooth cutting, the feed is provided in the direction of extent of the workpiece axis. The feed is likewise provided in this direction for producing a helical gearing. However, in the course of the feed, the phase position between the workpiece spindle and the tool spindle changes. The tool is a peeling wheel 1.

The peeling wheel 1 has a multiplicity of ribs arranged substantially uniformly about the peeling wheel rotational axis 2 in the circumferential direction. These ribs extend at an angle relative to the direction of the peeling wheel rotational axis 2. The peeling wheel is a helical gear peeling wheel 2. The angle by which the ribs 3 are offset with respect to the rotational axis 2 corresponds to the axis intersection angle $\alpha$, to be discussed in greater detail below. The axis intersection angle $\alpha$ may be approximately 20°. The ribs 3 are located on the peripheral face of the peeling wheel 1. The apex lines of the ribs 3 may lie in an enveloping surface 4 which corresponds to a cylindrical surface. However, the enveloping surface 4 in which the apex lines of the ribs 3 are situated is preferably formed by a conical lateral surface, the imaginary cone tip being situated at a distance from the free end face of the peeling wheel 1.

The free end face of the peeling wheel 1 forms cutting edges 5. The cutting edges 5 are formed by end faces of the ribs 3 which are ground in a stairstep manner. The step cut is designed in such a way that the cutting edges 5 engaging on the workpiece are situated transverse to the feed direction. This arrangement results in a positive cutting angle. The end face of each cutting tooth, the edges of which form the cutting edge 5, extends in a plane which is inclined by the angle $\alpha$, i.e., the axis intersection angle inclined with respect to the rotational plane of the tool spindle rotational axis 2.

The workpiece spindle (not illustrated) has a workpiece spindle rotational axis 13 which defines the Z axis of a coordinate system. The X axis of this coordinate system intersects the workpiece rotational axis 13 at the level of the tooth engagement zone, i.e., at the point at which the cutting edge 5 has the deepest engagement position in the gear blank 6. The axis extending at right angles thereto forms the Y axis. A plane E, parallel to the Y-Z plane, extending through the peeling wheel rotational axis 2, has a distance A from the Y-Z plane, i.e., from the workpiece rotational axis 13. The peeling wheel rotational axis 2 is pivotable about the axis intersection angle $\alpha$ within this parallel plane E, which is spaced from the Y-Z plane by the axial distance A. The device used for carrying out the method therefore requires only one swivel axis in order to set the axis intersection angle α. The axial distance A must also be variable. This may be made possible by moving either the workpiece spindle or the tool spindle relative to the machine bed.

For tooth cutting, the gear blank 6 is advanced in the axial direction of the workpiece rotational axis 13, i.e., in the Z direction. Here as well, as an alternative, the tool spindle may be moved in a corresponding manner. A radial feed may be superimposed on the axial feed. This allows the production of teeth in which the tooth grooves have different groove depths in the axial direction.

An internal gearing 7 is produced in the variant shown in FIGS. 3 and 4. The internal gearing 7 has an open end, illustrated on the left side, and a closed blind end, illustrated on the right side. In the region of the blind end, the groove base 8 terminates in the outer wall 9 of the blank 6, forming a quasi-rounding which is milled in a plurality of steps. To produce this internal gearing, in a first distance position A, machining is initially performed with a strictly axial feed 10.1 having a preset cutting depth. At the end of the axial feed, a radial component is superimposed on the axial component. The axial distance A is decreased, so that the cutting line 10.1 extends on an arc and produces a rounding 11.1 which terminates in the outer wall 9.

In a second cut 10.2 which is carried out with an increased axial distance A and is likewise initially performed strictly axially, the groove base of the first cut 10.1 is deepened by the same cutting depth. The second cut 10.2 also merges into a rounded contour at the end of the axial feed, but in this case the radial superimposition is carried out earlier in the axial direction, so that the rounding 11.2 produced in the second cut 10.2 terminates in the rounding 11.1 produced in the first cut 10.1.

The third cut 10.2 is carried out once again with an increased axial distance A, initially strictly axially, into the region of the end of the groove. This time as well, the superimposition of the radial feed component is carried out earlier compared to the previously made cut 10.2, so that the end rounding 11.3 produced by the third cut 10.3 terminates in the end rounding 11.2 produced by the second cut 10.2.

The cuts following these cuts are likewise each shortened in such a way that the end roundings merge into the previously produced end roundings. The last cut is denoted by reference numeral 10.4 in FIG. 4. It is apparent that the end rounding 11.4 produced by the last cut merges into the end rounding produced in the previously made cut.

The groove end produced using the method is thus composed of a multiplicity of partial roundings 11.1, 11.2, 11.3, and 11.4 following one another in succession.

Thus, each cutting line intersects all preceding cutting lines within the cross-sectional surface of the tooth groove.

In the previously described variant, cuts 10.1 through 10.4 are each offset by the same amount. However, these cuts may also be made at different cutting depths, for example with a continuously decreasing cutting depth or with a continuously increasing cutting depth.

FIG. 5 shows a cross-section, corresponding to FIG. 3, of a more complex workpiece. This workpiece has a first internal gearing 7 which may be produced as described above. The workpiece has an additional internal gearing 14 which is open at both ends. This internal gearing 14 has crowned teeth, and in particular has a base of the gearing 14 which extends on a curved line. In this case the submerging depth at the two ends of the gearing 14 is greater than in the region at the center of the gearing 14. Here as well, the axial distance A varies during the axial feed, so that the feed contains a radial component at the start and at the end. Unlike the previously described variant, however, the tooth groove is milled deeper at the start and at the end of the axial feed. The emerging motion is thus carried out at the start of the axial feed, and the submerging motion is carried out at the end of the axial feed.

Reference numeral 12 denotes an external gearing which, similarly as described above, may be produced using a peeling wheel, in this case instead of an increase in distance between the two axes a decrease in distance, or vice versa, taking place. The three gearings may be produced in a clamping device. The workpiece 6 may be held at the cutting zone 15 by a chuck.

FIG. 5 shows a step 16 which is situated behind the end of the gearing 7. This radially inwardly directed step 16 forms a collision zone. The end 7' of the groove 7 is located directly in front of the step 16. The distance may be less than the distance between two adjacent teeth of the gearing. No undercut or the like, which could result in material weakening, is necessary between the end 7' of the groove 7 and the step 16. The apex line of the gearing 7 is located on the inner wall 9 of the blank 6, the inner wall continuing until it reaches the rounding 17 that merges into the step 16. In the end region 7', the groove base 7 merges in a curved manner into the wall 9 of the blank.

To carry out the above-described method, the above-described device has the program-controlled electronic control device mentioned above. The electronic control device is set up in such a way that during cutting of teeth in a coarsely precut or uncut blank, a radial emerging motion from the gear blank is superimposed on the axial feed at the end of the feed.

The previously described method does not have to be carried out on a device as discussed in detail above. The device known from DE 10 2005 049 530 B4 may also be used for carrying out the method.

FIG. 6 shows the stepwise production of a groove provided with a blind end at both ends. The feed is provided in the axial direction from left to right along cutting lines 10.1, 10.2, 10.3, and 10.4, the tool in each case moving along the line provided with arrows. The submerging curves shown on the left side of FIG. 6 are steeper than is actually possible. Namely, the submerging angle depends on the clearance angle of the tool, i.e., the cone angle of the conical peeling wheel.

Here as well, the peeling machining of the uncut blank 6 is carried out in steps. Strictly by way of example, in the present case four cuts are illustrated, the first cut which extends along the cutting line 10.1 being the longest cut. The second cut 10.2 starts in the axial direction after the start of the first cut 10.2, so that the cutting edges 5 of the peeling wheel 1 submerge into the end roundings 11.1 which have been produced by the first cut 10.1. After the end rounding 11.2 is produced, a feed motion which is substantially strictly axial is provided until the end of the groove 7 is reached. At this location, the cutting edges 5 of the cutting wheel 1 emerge from the internal gearing 7 to be produced, so that the rounding 11.2 produced ends in the rounding 11.1 previously produced. A slight bend in the contour line results at this location as well as at the entry end. Here as well, the emerging motion is carried out in the axial direction upstream of the emerging motion of the preceding cut 10.1.

At the start of the third cut 10.3, the peeling wheel 1 submerges into the workpiece 6, offset with respect to the cutting line 10.2 of the preceding cut, which is to the right in the illustration, resulting in a rounding 11.3 which intersects with the previously produced rounding 11.2, forming a bend. The terminating rounding 11.3 of the third cut 10.3 once again intersects the terminating rounding 11.2 of the cut previously made. The same applies for the last cut 10.4 made, which is the shortest of all the cuts. Here as well, the successive cuts 10.1, 10.2, 10.3, 10.4 are made in such a way that a cutting line of the peeling wheel is intersected by all subsequent cutting lines of the peeling wheel, the intersection points being situated in the cross-sectional plane of the gearing.

All features disclosed are (in themselves) pertinent to the invention. The disclosure content of the associated/accompanying priority documents (copy of the prior application) is also hereby included in full in the disclosure of the application, including for the purpose of incorporating features of these documents in claims of the present application.

What is claimed is:

1. A method for cutting teeth in gear blanks by hob peeling, using a peeling wheel which has cutting edges, using a workpiece spindle for holding the gear blank, the workpiece spindle being rotationally driven about a workpiece rotational axis, and using a tool spindle which carries a peeling wheel and is rotationally driven about a tool rotational axis, wherein the tool spindle and the workpiece spindle may be positioned relative to one another at a fixed or variable axis intersection angle, forward feed and infeed taking place, the tool spindle in the radial direction relative to the workpiece spindle and in the axial direction with reference to the workpiece rotational axis, and the drives of the tool spindle and the workpiece spindle are rotationally driven at a specified rotational speed ratio, characterized in that during cutting of teeth in a coarsely precut or uncut blank, a radial emerging motion of the tool spindle out of the gear blank is superimposed on the axial feed of the tool spindle at the end of the feed, and/or a radial submerging motion into the gear blank is superimposed on the axial feed at the start of the feed, so that gear teeth are produced in which the tooth grooves are closed at at least one end, wherein the cutting of the gear teeth takes place in a plurality of successive steps, the tooth grooves of the gearing being deepened in a stepwise manner.

2. The method according to claim 1, wherein the successive steps each have a decreased axial cutting length.

3. The method according to claim 1, wherein the radial emerging motion occurs at the end of the feed of each subsequent cut in the axial direction, upstream of the radial emerging motion of the respective preceding cut.

4. The method according to claim 1, wherein each cutting line of a cut is intersected by the cutting lines of all subsequent cuts, the intersection points of the cutting lines being situated within a cross-sectional surface of the gearing formed by the apex line of the gearing and the groove base of the gearing.

5. The method according to claim 1, wherein the radial emerging motion is superimposed on the axial motion in such a way that the base of the tooth groove produced terminates in the form of a plurality of partial roundings following one another in succession in the axial direction.

6. The method according to claim 5, wherein the emerging motion is superimposed on the axial feed motion in such a way that the tooth groove produced has portions of a rounded profile.

7. The method of claim 1, wherein the relative position between the workpiece spindle drive and the tool spindle drive is not constant during cutting.

8. A device for cutting teeth in gear blanks by hob peeling, the device comprising:
a workpiece spindle for holding a coarsely precut or uncut gear blank, the workpiece spindle being rotationally drivable about a workpiece rotational axis, and
a tool spindle which carries a peeling wheel having cutting edges and which is rotationally drivable about a tool rotational axis,
wherein the tool spindle is moveable by means of positioning drives;
wherein the positioning drives, workpiece spindle drive and tool spindle drive are driven by an electronic control device in a program-controlled manner;
wherein the program in the electronic control device controls the tool spindle and the workpiece spindle drivable at the specified rotational speed ratio, wherein during cutting of teeth in a coarsely pre-cut or uncut blank, a radial emerging motion out of the gear blank of the tool spindle is superimposed on the axial feed of the tool spindle at the end of the feed and/or a radial submerging motion into the gear blank of the tool spindle is superimposed on the axial feed of the tool spindle at the start of the feed, so that the gear teeth are produced in which the tooth grooves are closed at at least one end, and
wherein the cutting of the gear teeth takes place in a plurality of successive steps and the tooth grooves of the gearing are deepened in a stepwise manner,
wherein by deepening the tooth grooves in a stepwise manner during the cutting, each of the tooth grooves forms a step from the bottom of the groove in axial direction to the uncut surface of the workpiece.

9. The device of claim 8, wherein the successive steps each have a decreased axial cutting length.

10. The device of claim 8, wherein the radial emerging motion occurs at the end of the feed of each subsequent cut in the axial direction, upstream of the radial emerging motion of the respective preceding cut.

11. The device of claim 8, wherein the radial emerging motion is superimposed on the axial motion in such a way that the base of the tooth groove produced terminates in the form of a plurality of partial roundings following one another in succession in the axial direction.

12. The device of claim 11, wherein the emerging motion is superimposed on the axial feed motion in such a way that the tooth groove produced has portions of a rounded profile.

13. The method according to claim 1, wherein by deepening the tooth grooves in a stepwise manner during the cutting, each of the tooth grooves forms a step from the bottom of the groove in axial direction to the uncut surface of the workpiece.

* * * * *